(12) United States Patent
Mendes et al.

(10) Patent No.: US 12,077,390 B2
(45) Date of Patent: Sep. 3, 2024

(54) CONVEYOR BELT ASSEMBLIES AND CLEANING ASSEMBLIES FOR HOLDING BLADES

(71) Applicant: Martin Engineering Company, Neponset, IL (US)

(72) Inventors: Pedro Mendes, Parauapebas-PÁ (BR); Marco Antonio Mônica, Paulinia/SP (BR); William Malta Valladão, Campinas-SP (BR)

(73) Assignee: Martin Engineering Company, Neponset, IL (US)

( * ) Notice: Subject to any disclaimer, the term of this patent is extended or adjusted under 35 U.S.C. 154(b) by 140 days.

(21) Appl. No.: 17/868,299

(22) Filed: Jul. 19, 2022

(65) Prior Publication Data
US 2023/0063423 A1 Mar. 2, 2023

Related U.S. Application Data

(60) Provisional application No. 63/239,491, filed on Sep. 1, 2021.

(51) Int. Cl.
*B65G 45/12* (2006.01)
(52) U.S. Cl.
CPC .................................. *B65G 45/12* (2013.01)
(58) Field of Classification Search
None
See application file for complete search history.

(56) References Cited

U.S. PATENT DOCUMENTS

| 4,202,437 | A | * | 5/1980 | Gordon | B65G 45/12 198/497 |
|---|---|---|---|---|---|
| 4,953,689 | A | | 9/1990 | Peterson et al. | |
| 5,007,523 | A | | 4/1991 | Morefield | |
| 7,308,980 | B2 | | 12/2007 | Peterson et al. | |
| 8,061,508 | B2 | | 11/2011 | Metzner | |

(Continued)

FOREIGN PATENT DOCUMENTS

| CN | 202880404 U | 4/2013 |
|---|---|---|
| CN | 208994574 U | 6/2019 |

(Continued)

OTHER PUBLICATIONS

International Search Report and Written Opinion dated Dec. 14, 2022 in related PCT Application No. PCT/US2022/042149 filed Aug. 31, 2022.

*Primary Examiner* — Kavel Singh
(74) *Attorney, Agent, or Firm* — Dinsmore & Shohl LLP

(57) ABSTRACT

A conveyor belt cleaning assembly includes a first rail member, a second rail member, and a locking mechanism for removably securing the first rail member to the second rail member. The first rail member includes a first base wall, a first leg extending from a first end of the first base wall, a second leg extending from an opposite second end of the first base wall, a first bottom retaining wall, and a first side retaining wall defining a first inner taper portion extending inwardly toward the second leg. The second rail member includes a second base wall, an inner wall, an opposite outer wall, a second bottom retaining wall, and a second side retaining wall defining a second inner taper portion extending inwardly toward the inner wall. The second inner taper portion is a mirror image of the first inner taper portion.

19 Claims, 7 Drawing Sheets

(56) References Cited

U.S. PATENT DOCUMENTS

| | | | |
|---|---|---|---|
| 8,393,459 B2 * | 3/2013 | Childs | B65G 45/12 |
| | | | 198/497 |
| 9,738,456 B1 * | 8/2017 | Grimm | B65G 45/12 |
| 2006/0108200 A1 | 5/2006 | Peterson et al. | |
| 2013/0026008 A1 | 1/2013 | Childs et al. | |

FOREIGN PATENT DOCUMENTS

| | | |
|---|---|---|
| CN | 209030984 U | 9/2019 |
| CN | 210943491 U | 7/2020 |
| CN | 211168705 U | 8/2020 |
| CN | 212153261 U | 12/2020 |

* cited by examiner

CONVEYOR BELT ASSEMBLIES AND CLEANING ASSEMBLIES FOR HOLDING BLADES

CROSS-REFERENCE TO RELATED APPLICATION

This application claims the benefit of U.S. Provisional Patent Application No. 63/239,491, filed Sep. 1, 2021, for "Conveyor Belt Assemblies And Cleaning Assemblies For Holding Blades," which is hereby incorporated by reference in its entirety including the drawings.

TECHNICAL FIELD

The present specification generally relates to conveyor belt assemblies for transporting material by a conveyor belt and, more specifically, conveyor belt cleaning assembles for removing material from a surface of a conveyor belt.

BACKGROUND

Conveyor belt cleaners are equipment used in belt conveyors that were previously considered to be secondary equipment, but currently have been considered process equipment. This has increased the notoriety and demand of conveyor belt cleaners regarding availability, safety, ease of maintenance, and environmental impact.

Conventional belt cleaners, including primary belt cleaners and secondary belt cleaners, include a one-piece blade holder and a blade secured within the blade holder to accurately position the blade against an exterior surface of a conveyor belt. However, one-piece blade holders present great difficulty in changing the blades when the life of the blades becomes expended or repair is required. Typically, the blades must be replaced by using tools to loosen the blade from blade holder and slide the blade along a longitudinal axis of the blade holder until the specific blade is slid out of the blade holder and can be removed. This requires the use of tools for this maintenance, whether to loosen any screws or type of fixation, or even the use of hammers to slide the blade along the rail.

Accordingly, a need exists for improved conveyor belt cleaning blade holders that permit removal of a blade without the use of any tools.

SUMMARY

In one embodiment, a conveyor belt cleaning assembly includes: a first rail member including a first base wall, a first leg extending from a first end of the first base wall, a second leg extending from a second end of the first base wall opposite the first leg, a first bottom retaining wall, and a first side retaining wall defining a first inner taper portion extending inwardly toward the second leg, wherein the first base wall, the first leg, and the second leg define a longitudinal channel; a second rail member including a second base wall, an inner wall, an outer wall opposite the inner wall, a second bottom retaining wall, and a second side retaining wall defining a second inner taper portion extending inwardly toward the inner wall, the second inner taper portion being a mirror image of the first inner taper portion; and a locking mechanism for removably securing the first rail member to the second rail member.

In another embodiment, a conveyor belt assembly includes: a roller; a conveyor belt rotatable across an exterior surface of the roller; a conveyor belt cleaning assembly including a first rail member including a first base wall, a first leg extending from a first end of the first base wall, a second leg extending from a second end of the first base wall opposite the first leg, a first bottom retaining wall, and a first side retaining wall defining a first inner taper portion extending inwardly toward the second leg, wherein the first base wall, the first leg, and the second leg define a longitudinal channel; a second rail member including a second base wall, an inner wall, an outer wall opposite the inner wall, a second bottom retaining wall, and a second side retaining wall defining a second inner taper portion extending inwardly toward the inner wall, the second inner taper portion being a mirror image of the first inner taper portion; and a locking mechanism for removably securing the first rail member to the second rail member; and a blade secured between the first rail member and the second rail member, the blade including a first shoulder, a second shoulder, and a neck having a width less than a distance between the first shoulder and the second shoulder, wherein a tip end of the blade is positioned to contact an exterior surface of the conveyor belt.

In yet another embodiment, a method includes: providing a first rail member having a first blade cavity; positioning a first shoulder of a blade within the first blade cavity; positioning a second rail member to mate with the first rail member such that a second shoulder of the blade is received within a second blade cavity; and securing the second rail member to the first rail member to prevent removal of the blade from the first rail member and the second rail member.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
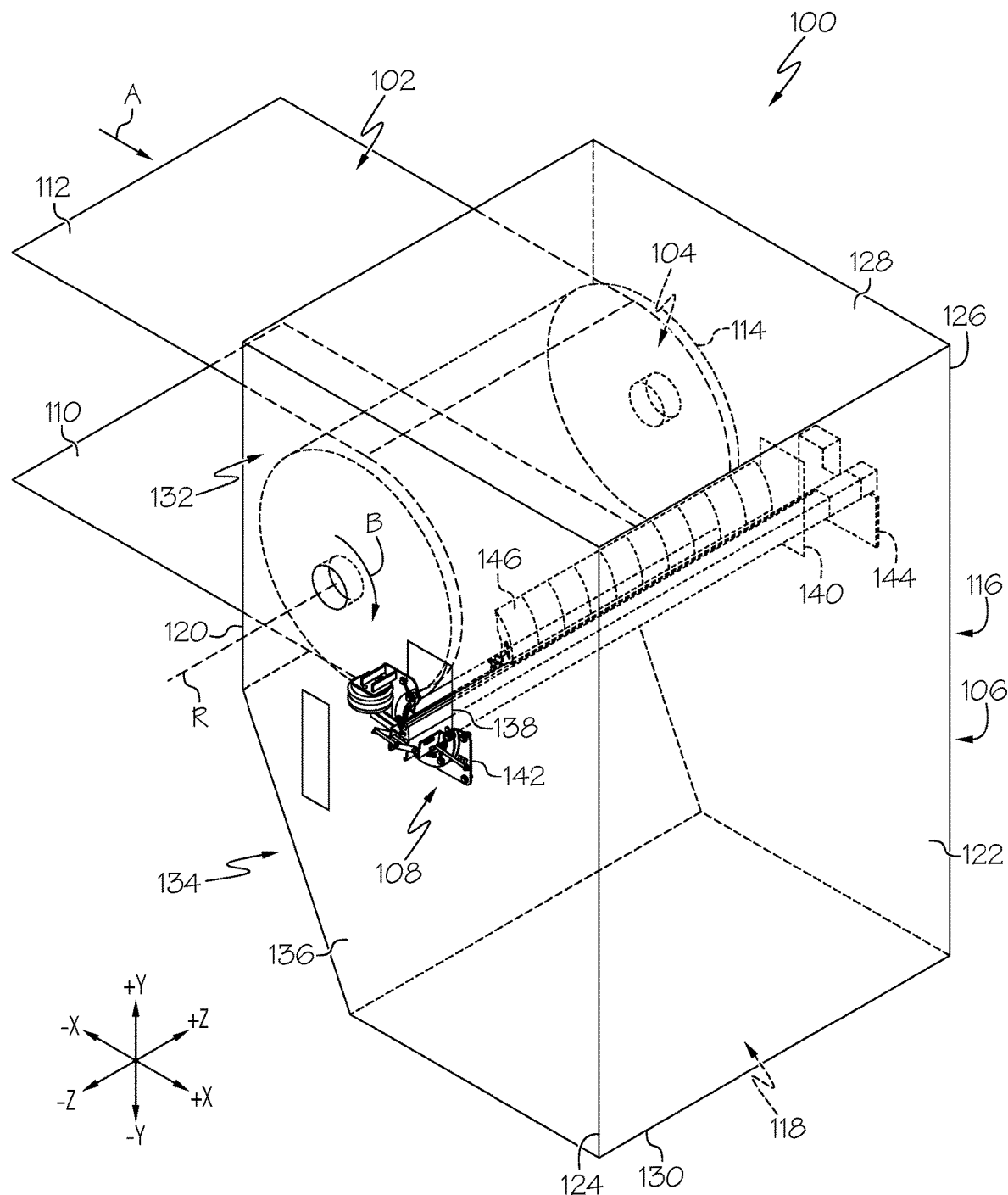
FIG. 1 schematically depicts a perspective view of a conveyor belt assembly, according to one or more embodiments shown and described herein.

Embodiments described herein are directed to conveyor belt assemblies and conveyor belt cleaning assemblies for permitting the removal of cleaning blades without the use of any tools. The conveyor belt cleaning assemblies include a first rail member, a second rail member, and a locking mechanism for removably securing the first rail member to the second rail member. The first rail member includes a first base wall, a first leg extending from a first end of the first base wall, a second leg extending from an opposite second end of the first base wall, a first bottom retaining wall, and a first side retaining wall defining a first inner taper portion extending inwardly toward the second leg. The second rail member includes a second base wall, an inner wall, an opposite outer wall, a second bottom retaining wall, and a second side retaining wall defining a second inner taper portion extending inwardly toward the inner wall. The second inner taper portion is a mirror image of the first inner taper portion. Various embodiments of the conveyor belt cleaning assemblies and the operation of removing a blade from the conveyor belt cleaning assemblies are described in more detail herein. Whenever possible, the same reference numerals will be used throughout the drawings to refer to the same or like parts.

As used herein, the term "longitudinal direction" refers to the forward-rearward direction (i.e., in the +/−Z direction of the coordinate axes depicted in FIG. 1). The term "lateral direction" refers to the cross direction (i.e., in the +/−X direction of the coordinate axes depicted in FIG. 1), and is transverse to the longitudinal direction. The term "vertical direction" refers to the upward-downward direction (i.e., in the +/−Y direction of the coordinate axes depicted in FIG. 1). As used herein, "upper" and "above" are defined as the positive Y direction of the coordinate axes shown in the drawings. "Lower" and "below" are defined as the negative Y direction of the coordinate axes shown in the drawings. Further, the terms "outboard" or "outward" as used herein refers to the relative location of a component with respect to a centerline. The term "inboard" or "inward" as used herein refers to the relative location of a component with respect to the centerline.

Referring now to FIG. 1, a conveyor belt assembly 100 is illustrated according to one or more embodiments described herein. The conveyor belt assembly 100 may generally include a conveyor belt 102, a roller 104, a chute 106, and a conveyor belt cleaning assembly 108. The conveyor belt 102, having an interior surface 110 and an exterior surface 112 opposite the interior surface 110, wraps around an exterior surface 114 of the roller 104 and moves in the direction of arrow A. As such, the interior surface 110 of the conveyor belt 102 is in contact with the exterior surface 114 of the roller 104. In embodiments, the roller 104 may be rotatably fixed to the chute 106 or some other mounting structure and have a smooth exterior surface 114 having a low coefficient of friction permitting the conveyor belt 102 to pass over the exterior surface 114 of the roller 104 with minimal resistance. In this embodiment, the conveyor belt 102 may be drawn in the direction of arrow A across the roller 104 by another roller not shown. Alternatively, the roller 104 may passively rotate in the direction of arrow B about a rotational axis R to facilitate movement of the conveyor belt 102 in the direction of arrow A. As such, the roller 104 may be rotatably coupled to the chute 106 or some other mounting structure. In this embodiment, the exterior surface 114 of the roller 104 may have a high coefficient of friction to grip the interior surface 110 of the conveyor belt 102 and assist in drawing the conveyor belt 102 in the direction of arrow A. In other embodiments, a motor or the like, not shown, may be provided for mechanically operating the roller 104 and rotating the roller 104 in the direction of arrow B to draw the conveyor belt 102 in the direction of arrow A.

As shown, the chute 106 includes a housing 116 having one or more walls defining an open interior 118. In embodiments, the one or more walls includes a front wall 120, a rear wall 122 opposite the front wall 120, a first side wall 124, a second side wall 126 opposite the first side wall 124, a top wall 128, and a bottom wall 130 opposite the top wall 128. An access port 132 is formed in the front wall 120 for permitting the conveyor belt 102 to enter and exit the open interior 118 of the chute 106. In embodiments, a lower portion 134 of the front wall 120 may define an inwardly tapered portion 136. As shown, the roller 104 is at least partially positioned within the open interior 118 of the chute 106. As such, the portion of the conveyor belt 102 that is wrapped around the roller 104 is also positioned within the open interior 118 of the chute 106. Although not shown, one or more of the front wall 120, the rear wall 122, the top wall 128, and the bottom wall 130 may include one or more openings for permitting material to enter and exit the chute 106.

In use, the conveyor belt 102 may be utilized for transporting material from one location to another. However, the material may become stuck to the surface of the conveyor belt 102 such that, if the material is not removed, the material may affect the performance of the conveyor belt 102 as it returns to collect additional material or transport additional product. Therefore, the conveyor belt cleaning assembly 108 is provided within the chute 106 for cleaning the exterior surface 112 of the conveyor belt 102 as it enters the chute 106 and before exiting the chute 106.

More particularly, in embodiments, a first window 138 may be formed in the first side wall 124 and a second window 140 may be formed in the second side wall 126. The conveyor belt cleaning assembly 108 may be insertable into the open interior 118 of the chute 106 through the first window 138 and the second window 140 and removably fixed in position to the chute 106 using one or more fasteners, such as screws, bolts, rivets, clips, clamps, or the like. As described in more detail herein, the conveyor belt cleaning assembly 108 may include a first mounting bracket 142 and a second mounting bracket 144 for fixing the conveyor belt cleaning assembly 108 to the first side wall 124 and the second side wall 126, respectively, on an outside surface thereof. The conveyor belt cleaning assembly 108 also includes one or more blades 146 positioned relative to the conveyor belt 102 to contact the exterior surface 112 of the conveyor belt 102 and dislodge or otherwise remove material therefrom as the conveyor belt 102 rotates across the roller 104 and passes through the chute 106. As material is dislodged from the conveyor belt 102, the dislodged material is collected at a bottom portion of the chute 106.

Figure 2:
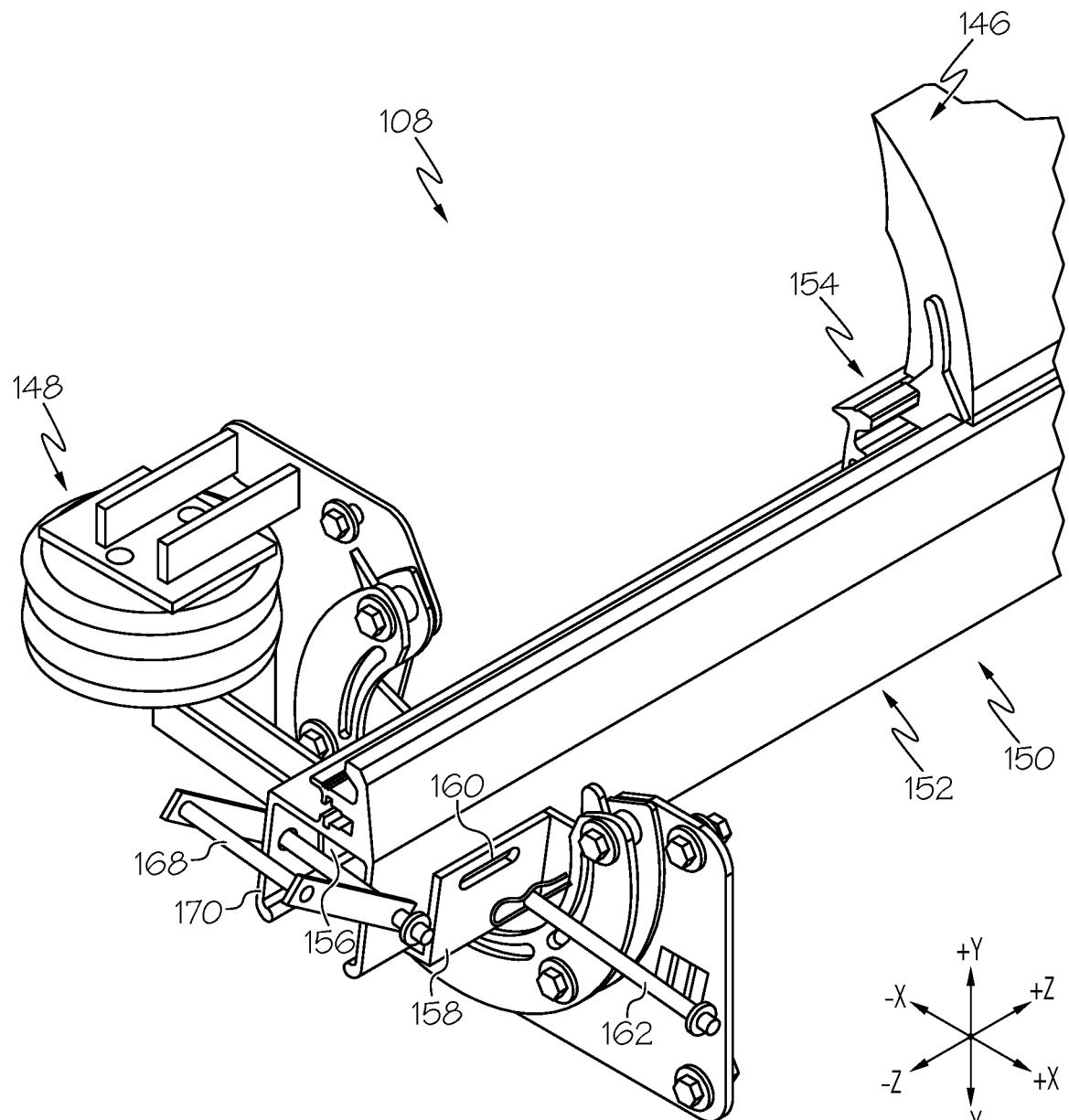
FIG. 2 schematically depicts a partial perspective view of a conveyor belt cleaning assembly of the conveyor belt assembly of FIG. 1, according to one or more embodiments shown and described herein.

Referring now to FIG. 2, the conveyor belt cleaning assembly 108 is shown separate from the chute 106. In embodiments, the conveyor belt cleaning assembly 108 includes a tensioner 148, a rail assembly 150 including a first rail member 152 and a second rail member 154, and a guide track 156. The tensioner 148 may be a pneumatic tensioner or the like for positioning the conveyor belt cleaning assembly 108 relative to the conveyor belt 102 and the roller 104 when within the chute 106. As shown, the tensioner 148 may be fixed to or extend from the first mounting bracket 142. A support bracket 158 extends from either the tensioner 148 or the first mounting bracket 142 and is dimensioned to receive the rail assembly 150, specifically the first rail member 152. In embodiments, the support bracket 158 is a U-shaped member extending along a perimeter of the first rail member 152. Although only one is shown, a pair of slots 160 are formed in opposite sides of the support bracket 158 for receiving a locking pin 162 when the locking pin 162 is in an inserted position. In embodiments, the support bracket 158 and the first rail member 152 may be a one-piece, monolithic structure such that the support bracket 158 forms a bottom surface of the first rail member 152. Accordingly, the first rail member 152 would be fixed to the tensioner 148. This may result in the tensioner 148 sliding with the first rail member 152 relative to the guide track 156.

The rail assembly 150, particularly the first rail member 152, has a pair of holes 164 (FIG. 3) formed in opposite sides thereof for receiving the locking pin 162 when the holes 164 in the rail assembly 150 are aligned with the slots 160 formed in the support bracket 158. Thus, the locking pin 162, when in the inserted position and extending through the slots 160 formed in the support bracket 158 and the holes 164 formed in the rail assembly 150, locks the rail assembly 150 in position relative to the tensioner 148.

As described in more detail herein, the guide track 156 is shown extending through the rail assembly 150 in the longitudinal direction. In embodiments, the guide track 156 also includes a pair of holes 166 (FIG. 3) formed in opposite sides of the guide track 156 for receiving the locking pin 162 when aligned with the holes 164 formed in the rail assembly 150 and the slots 160 formed in the support bracket 158 of the tensioner 148. As shown in FIG. 2, the locking pin 162 is shown in a removed position from the support bracket 158 such that the rail assembly 150 may be removed from the tensioner 148 and the guide track 156. Alternatively, the locking pin 162 is shown in the inserted position within the rail assembly 150 and the guide track 156 in FIG. 3.

As described in more detail herein, when the locking pin 162 is removed from the rail assembly 150, the guide track 156, and the support bracket 158, the rail assembly 150 is permitted to slide along the guide track 156 in the longitudinal direction to be removed from the guide track 156 and the support bracket 158. In embodiments, the rail assembly 150 may include a handle 168 provided proximate a first end 170 of the rail assembly 150 for facilitating pulling the rail assembly 150 from the guide track 156 once the locking pin 162 is removed. In embodiments, the handle 168 is fixed to the first rail member 152 and extends from the first rail member 152 at any suitable angle to facilitate pulling the rail assembly 150 from the support bracket 158 and the guide track 156. In embodiments, the handle 168 may extend in an upward vertical direction from the first rail member 152 toward the one or more blades 146. In other embodiments, the handle 168 may extend parallel to a longitudinal direction of the rail assembly 150. In yet other embodiments, the handle 168 may extend from the first rail member 152 in a downward vertical direction away from the one or more blades 146. In other embodiments, the handle 168 may be pivotally attached to the first rail member 152 such that the orientation of the handle 168 relative to the rail assembly 150 may be adjusted as necessary to facilitate pulling the rail assembly 150 from the support bracket 158 and the guide track 156.

Figure 3:
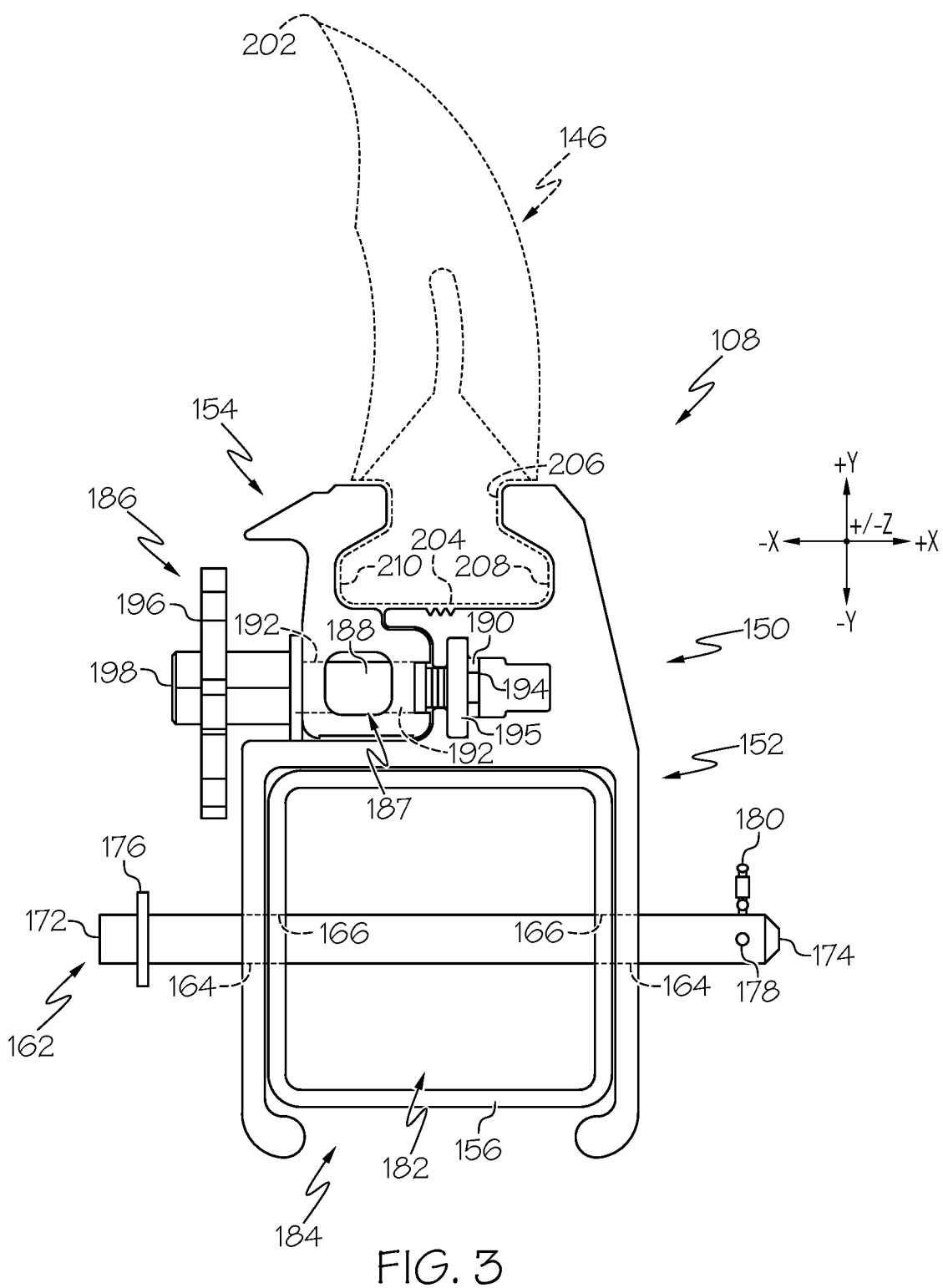
FIG. 3 schematically depicts an end view of the conveyor belt cleaning assembly of FIG. 2, according to one or more embodiments shown and described herein.

Referring now to FIG. 3, the guide track 156 is shown extending through the rail assembly 150 with the locking pin 162 in the inserted position. However, the support bracket 158 and the tensioner 148 are not shown to better illustrate the other components. As discussed herein, the locking pin 162 is inserted through the holes 164 formed in the rail assembly 150, specifically the first track portion, and the holes 166 formed in the guide track 156. In embodiments, the locking pin 162 includes a first end 172 and a second end 174 opposite the first end 172. A collar 176 may be provided at or proximate the first end 172 of the locking pin 162. The collar 176 has an outer diameter greater than a diameter of the slot 160 formed in the support bracket 158 (FIG. 3) and in embodiments, greater than a diameter of the holes 164 formed in the first rail member 152 so that the collar 176 abuts against the support bracket 158 to function as a stop to prevent the locking pin 162 from being inserted entirely through the support bracket 158 and the first rail member 152. An aperture 178 may be formed in the locking pin 162 proximate the second end 174 of the locking pin 162 for receiving a clip 180. Once the clip 180 is inserted into the aperture 178, the locking pin 162 is secured in the inserted position and prohibited from being moved to the removed position until the clip 180 is removed from the aperture 178 so that the second end 174 of the locking pin 162 may pass through each of the slots 160 formed in the support bracket 158.

Referring still to FIG. 3, as described in more detail herein, the first rail member 152 of the rail assembly 150 defines a channel 182 for receiving the guide track 156. The channel 182 defined by the first rail member 152 has a cross-sectional geometry corresponding to the cross-sectional geometry of the guide track 156 to prevent rotation of the rail assembly 150 relative to the guide track 156 prior to the locking pin 162 being inserted. As shown, in embodiments, the channel 182 has a rectangular cross-sectional geometry corresponding to a rectangular cross-sectional geometry of the guide track 156. However, it should be appreciated that the channel 182 of the first rail member 152 and the guide track 156 may have any suitable cross-sectional geometry such as, for example, triangular, square, and the like. When the rail assembly 150 is slidably positioned on the guide track 156, the first rail member 152 is seated on the guide track 156. In embodiments, as shown, the channel 182 may be defined by an open bottom end 184. Although the channel 182 may have an open bottom end 184, it should be appreciated that the rail assembly 150 is only permitted to be removed from the guide track 156 by removing the locking pin 162 and sliding the rail assembly 150 along the guide track 156 in the longitudinal direction, as opposed to lifting the rail assembly 150 relative to the guide track 156 in the vertical direction. In other embodiments, the first rail member 152 may define a closed bottom end 184 of the channel 182. As discussed herein, the support bracket 158 may be formed as a one-piece, monolithic structure with the first rail member 152, thereby defining the closed bottom end 184.

As described in more detail herein, one or more locking mechanisms 186 are provided for securing the second rail member 154 to the first rail member 152. As shown in FIG. 3, a locking mechanism 186 is shown including an externally threaded bolt 187 including a bolt head 190 provided at an end 194 of the bolt 187. In embodiments, the bolt 187 extends through a pair of holes 192 (FIG. 6) formed in opposite sides of the second rail member 154. In embodiments, the locking mechanism 186 includes an internally threaded shaft 188 and a knob 196 provided proximate an end 198 of the shaft 188. In embodiments, the shaft 188 includes a hexagonal outer profile portion proximate the end 198 and a cylindrical outer profile portion opposite the hexagonal outer profile portion. The knob 196 is configured to engage the hexagonal outer profile portion of the shaft 188. In use, the externally threaded bolt 187 engages the internally threaded shaft 188. In embodiments, the knob 196 provided on the second end 198 of the shaft 188 may include a plurality of spokes 200 (FIG. 4) to improve gripability and rotation of the knob 196. The knob 196 allows for rotation of the shaft 188 relative to the bolt 187. As such, rotation of the shaft 188 via the knob 196 in a first direction will result in the shaft 188 threadedly engaging the bolt 187 while rotation of the shaft 188 in an opposite second direction will result in the shaft 188 threadedly disengaging the bolt 187. Thus, it should be appreciated that rotation of the knob 196 in a first direction to cause the shaft 188 from disengaging the bolt 187 will permit the second rail member 154 to be separated from the first rail member 152. In embodiments, the bolt 187 may be integrally formed as a one-piece, monolithic structure with the first rail member 152. In other embodiments, it should be appreciated that the shaft 188 may extend in an opposite direction through the first rail member 152 for engaging the bolt 187 provided in the second rail member 154. Alternatively, in embodiments, the bolt 187 may have internal threads configured to engage external threads of the shaft 188.

Figure 4:
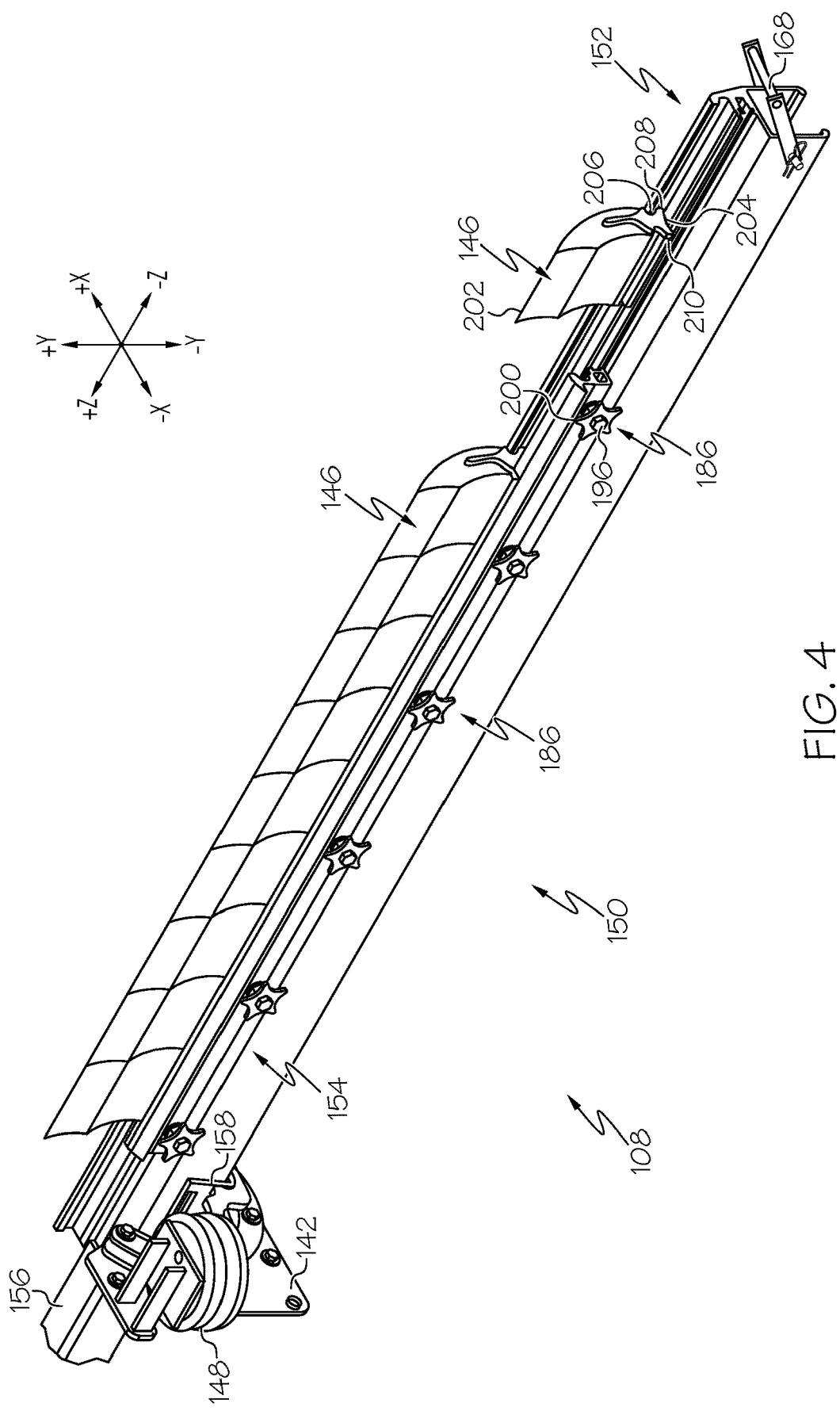
FIG. 4 schematically depicts a perspective view of the conveyor belt cleaning assembly of FIG. 2 in a partially removed position, according to one or more embodiments shown and described herein.

In embodiments, a fixing bar 195 may be provided within a first recessed portion 250 (FIG. 5) of the first rail member 152 and may extend in the longitudinal direction along the rail assembly 150. The bolt 187 extends through the fixing bar 195. In embodiments, the bolt 187, specifically the bolt head 190, is fixed to the fixing bar 195 such as, for example, by welding or the like. In embodiments, it should be appreciated that a plurality of locking mechanisms 186 may be provided, as shown in FIG. 4. Accordingly, the fixing bar 195 facilitates positioning the bolt 187 of each locking mechanism 186 relative to one another to maintain a fixed spaced relation of each bolt 187. This allows for simultaneous movement of each bolt 187 such that each bolt 187 may be easily oriented within the holes 192 in the second rail member 154 simultaneously.

Referring now to FIG. 4, the rail assembly 150 is shown being slidably removed from the guide track 156 along the longitudinal direction, the one or more locking mechanisms 186 being loosened to allow for separation of the second rail member 154 from the first rail member 152, and thus removal of one or more of the blades 146. More particularly, once the rail assembly 150 has been slidably removed from the guide track 156, the one or more locking mechanisms 186 may be rotated to permit removal of the second rail member 154 from the first rail member 152. As shown in FIG. 4, a plurality of locking mechanisms 186 are provided extending through the second rail member 154. The locking mechanisms 186 are spaced apart from one another along the second rail member 154 to engage the first rail member 152. In embodiments, the locking mechanisms 186 may be spaced apart from one another along the second rail member 154. While the locking mechanisms 186 may be disengaged to permit removal of the second rail member 154 prior to sliding the rail assembly 150 off of the guide track 156, it should be appreciated that the locking mechanisms 186 may not be accessible with the rail assembly 150 positioned within the chute 106.

In embodiments, the first rail member 152 and the second rail member 154 may be formed from a rigid material such as, for example, metal, aluminum, steel, and the like. Accordingly, it may be required that, in embodiments in which a plurality of locking mechanisms 186 are provided, each of the locking mechanisms 186 are at least partially loosened to permit the second rail member 154 from being separated from the first rail member 152. As discussed herein, one or more blades 146 are provided between the first rail member 152 and the second rail member 154. In embodiments, a single blade 146 may be provided having a length extending along the longitudinal direction of the rail assembly 150 substantially equal to a length of the second rail member 154. Alternatively, as shown, a plurality of blades 146 may be provided and positioned next to one another to extend along the longitudinal direction of the rail assembly 150 such that a total length of the plurality of blades 146 is substantially equal to the length of the second rail member 154. In this embodiment, individual blades 146 may be slidably removed from between the first rail member 152 and the second rail member 154 once the locking mechanisms 186 are at least partially unscrewed from the first rail member 152 to permit the second rail member 154 to be separated from the first rail member 152. As such, individual blades 146 may be removed when the blades 146 have been worn and need to be replaced by new blades 146.

As shown in FIGS. 3 and 4, the blade 146 has a tip end 202 for contacting the surface of the conveyor belt 102 while in use to removing material therefrom and a base end 204 opposite the tip end 202. In embodiments, the tip end 202 of the blade 146 may be flat such that the tip end 202 conforms to a planar surface of the conveyor belt 102 in contact therewith. The base end 204 of the blade 146 is received between the first rail member 152 and the second rail member 154 and secured therebetween when the locking mechanisms 186 are secured to the first rail member 152 and the second rail member 154. The base end 204 of the blade 146 is defined by a neck 206, a first shoulder 208, and a second shoulder 210. The first shoulder 208 and the second shoulder 210 extend outwardly from the neck 206 opposite the top end of the blade 146 such that the neck 206 has a reduced width compared to a distance between the first shoulder 208 and the second shoulder 210.

Figure 5:
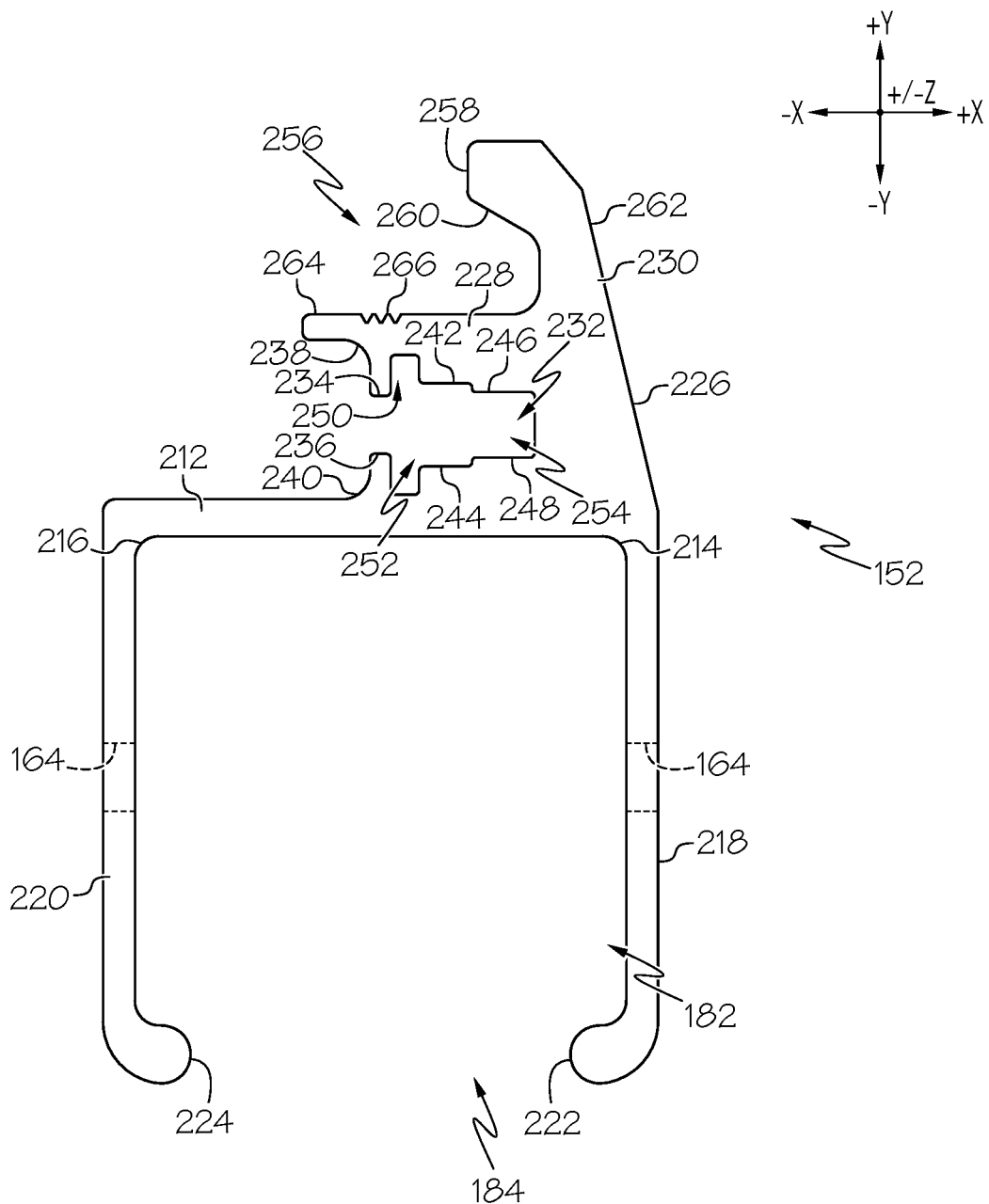
FIG. 5 schematically depicts an end view of a first rail member of the conveyor belt cleaning assembly of FIG. 2, according to one or more embodiments shown and described herein.

Referring now to FIG. 5, the first rail member 152 is shown. The first rail member 152 includes a first base wall 212 having a first end 214 and a second end 216 opposite the first end 214, a first leg 218 extending from the first end 214, and a second leg 220 extending from the second end 216 opposite the first leg 218. The first base wall 212, the first leg 218, and the second leg 220 define the channel 182 discussed herein for receiving the guide track 156. The first leg 218 has an inwardly extending first tip 222 formed opposite the first base wall 212 and extending toward the second leg 220. Similarly, the second leg 220 has an inwardly extending second tip 224 formed opposite the first base wall 212 and extending toward the first leg 218. In embodiments, the first tip 222 and the second tip 224 extend partially across the channel 182 to define the open bottom end 184 of the channel 182. As shown, the first tip 222 and the second tip 224 each have a rounded profile. As such, the first tip 222 and the second tip 224 reduce a distance of the open bottom end 184 of the channel 182 to prevent the first rail member 152 from being removed from the guide track 156 in any manner other than when sliding in the longitudinal direction. In other embodiments, the first tip 222 and the second tip 224 may extend entirely or substantially across the channel 182 to define a closed or substantially closed bottom end 184 of the channel 182.

The first rail member 152 further includes a medial wall 226 extending vertically from the first base wall 212 above the first leg 218, a first bottom retaining wall 228 extending horizontally, i.e., in the lateral direction, from the medial wall 226 opposite the first base wall 212, and a first side retaining wall 230 extending vertically from the medial wall 226 and substantially perpendicular to the first bottom retaining wall 228. In embodiments, the first rail member 152, including the first base wall 212, the first leg 218, the second leg 220, the medial wall 226, the first bottom retaining wall 228, and the first side retaining wall 230, is a one-piece, monolithic structure. However, it should be appreciated that in other embodiments, the first rail member 152 may include a plurality of separable components attached or otherwise joined to one another.

A nut recess 232 is defined by the first base wall 212, the medial wall 226, and the first bottom retaining wall 228 for receiving the nut 190, as described herein and illustrated in FIG. 3. More particularly, the nut recess 232 is defined by an upper finger 234 and a lower finger 236 extending inwardly toward one another from the first bottom retaining wall 228 and the first base wall 212, respectively. An upper concave surface 238 is formed at an intersection of the upper finger 234 and the first bottom retaining wall 228 opposite the medial wall 226. Additionally, a lower concave surface 240 is also formed at an intersection of the lower finger 236 and the first base wall 212 opposite the medial wall 226. The upper finger 234 and the lower finger 236 define a stop for the nut 190 to abut against when positioned within the nut recess 232, thereby retaining the nut 190 within the nut recess 232.

The nut recess 232 is further defined by a first upper step 242, a first lower step 244 opposite the first upper step 242, a second upper step 246, and a second lower step 248 opposite the second upper step 246. As such, the nut recess 232 includes a first recessed portion 250 defined between the upper finger 234 and the lower finger 236 on one side and the first upper step 242 and the first lower step 244 on an opposite side. The nut recess 232 also includes a second recessed portion 252 defined between the first upper step 242 and the first lower step 244 on one side and the second upper step 246 and the second lower step 248 on an opposite side. The second recessed portion 252 has an inner diameter less than an inner diameter of the first recessed portion 250. The nut recess 232 further includes a third recessed portion 254 defined between the second upper step 246 and the second lower step 248 on one side and the medial wall 226 on an opposite side. In embodiments, as shown, the third recessed portion 254 has an inner diameter less than the inner diameter of the second recessed portion 252. However, it should be appreciated that in other embodiments not illustrated, the inner diameter of the third recessed portion 254 may be greater than the inner diameter of the second recessed portion 252. The third recessed portion 254 functions to receive an end of the shaft 188 of the locking mechanism 186 extending through the nut 190, as discussed herein.

The first bottom retaining wall 228 and the first side retaining wall 230 define a first blade cavity 256 for receiving and retaining the neck 206 and the first shoulder 208 of the blade 146. More particularly, an inner surface 258 of the first side retaining wall 230 forms a first inner taper portion 260 extending inwardly toward a free end of the first bottom retaining wall 228 and the first leg 218 corresponding to the contour of a transition from the first shoulder 208 of the blade 146 to the neck 206 of the blade 146. An outer surface of the first side retaining wall 230 also forms a first outer taper portion 262.

In embodiments, an upper surface 264 of the first bottom retaining wall 228 includes one or more ridges 266. More particularly, the upper surface 264 of the first bottom retaining wall 228 includes a plurality of ridges 266 extending in the longitudinal direction along the first rail member 152. The plurality of ridges 266 may be formed as a result of extrusion of the first rail member 154. In embodiments, the plurality of ridges 266 do not extend higher than an upper surface of the first bottom retaining wall 228. It should be appreciated that the formation of the ridges 266 controls the straightness of the first bottom retaining wall 228 during the extrusion process.

Figure 6:
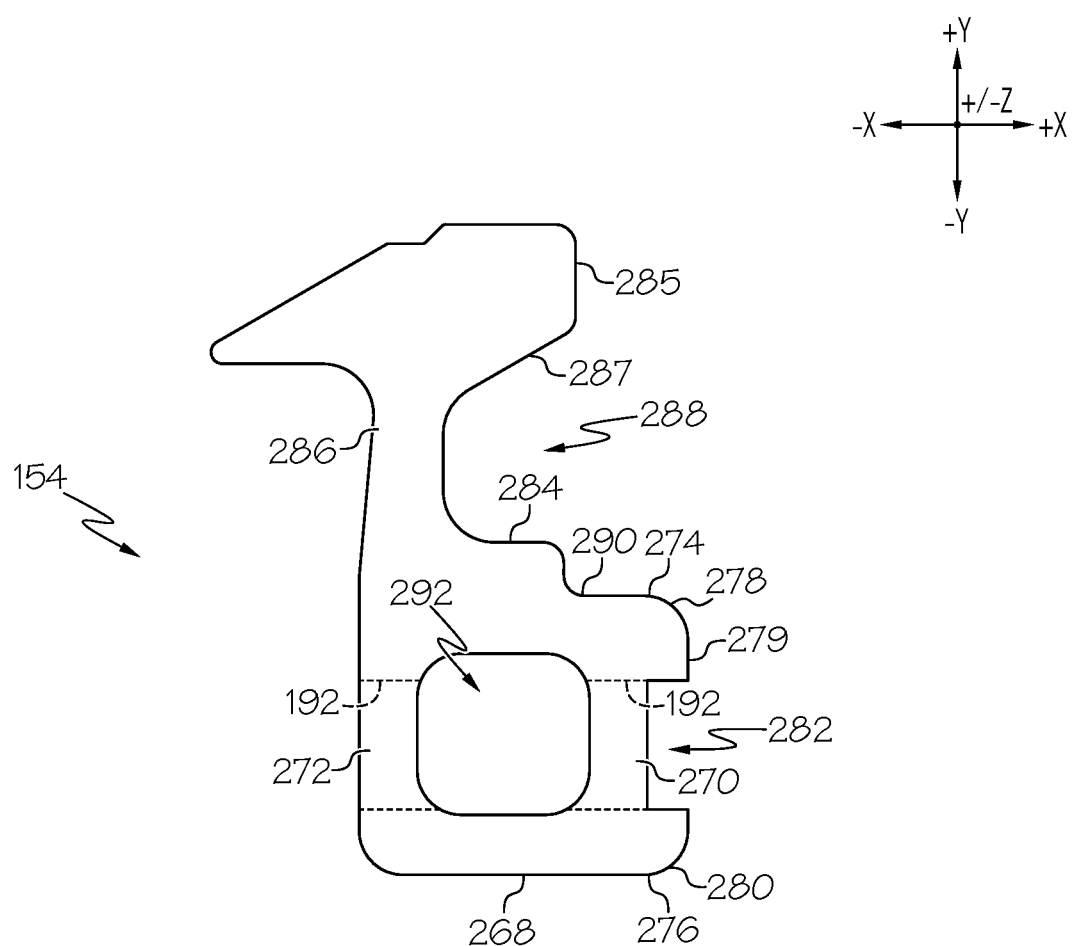
FIG. 6 schematically depicts an end view of a second rail member of the conveyor belt cleaning assembly of FIG. 2, according to one or more embodiments shown and described herein.

Referring now to FIG. 6, the second rail member 154 is shown. The second rail member 154 includes a second base wall 268, an inner wall 270, and an outer wall 272 opposite the inner wall 270. The inner wall 270 and the outer wall 272 extend vertically from and perpendicular to the second base wall 268. The inner wall 270 has an upper end 274 and a lower end 276 opposite the upper end 274. An upper convex surface 278 is formed on an exterior surface 279 of the inner wall 270 at the upper end 274 and a lower convex surface 280 is formed on the exterior surface 279 of the inner wall 270 at the lower end 276. An inner leg recess 282 is formed in the inner wall 270 between the upper convex surface 278 and the lower convex surface 280 extending toward the outer wall 272.

The second rail member 154 further includes a second bottom retaining wall 284 and a second side retaining wall 286 defining a second blade cavity 288 for receiving and retaining the neck 206 and the second shoulder 210 of the blade 146 (FIG. 4). More particularly, an inner surface 285 of the second side retaining wall 286 forms a second inner taper portion 287 extending inwardly toward the inner wall 270 corresponding to the contour of a transition from the second shoulder 210 of the blade 146 to the neck 206 of the blade 146. It should be appreciated that the second inner taper portion 287 is a mirror image of the first inner taper portion 260. A step 290 is formed between the second bottom retaining wall 284 extending toward the inner wall 270. As discussed herein, the step 290 is configured to receive an end of the first bottom retaining wall 228 of the first rail member 152 (FIG. 5). As such, the second rail member 154 the end of the first bottom retaining wall 228 prevents the second rail member 154 from separating from the first rail member 152 in the vertical direction. In embodiments, the second rail member 154, including the second base wall 268, the inner wall 270, the outer wall 272, the second bottom retaining wall 284, and the second side retaining wall 286, is a one-piece, monolithic structure. However, it should be appreciated that in other embodiments, the second rail member 154 may include a plurality of separable components attached or otherwise joined to one another.

In embodiments, a channel 292 is formed between the second base wall 268, the inner wall 270, the outer wall 272, and the second bottom retaining wall 284. The channel 292 extends in the longitudinal direction throughout a substantial portion of the second rail member 154. In embodiments, the channel 292 extends entirely through the second rail member 154 in the longitudinal direction. It should be appreciated that the channel 292 may be provided to reduce the weight of the second rail member 154 and thus material costs. As discussed herein, a pair of holes 192 are formed in the second rail member 154 for receiving the shaft 188 of the locking mechanism 186 (FIG. 3). Specifically, the holes 192 are formed in the inner wall 270 and the outer wall 272, respectively, such that the shaft 188 extends through the channel 292.

Figure 7:
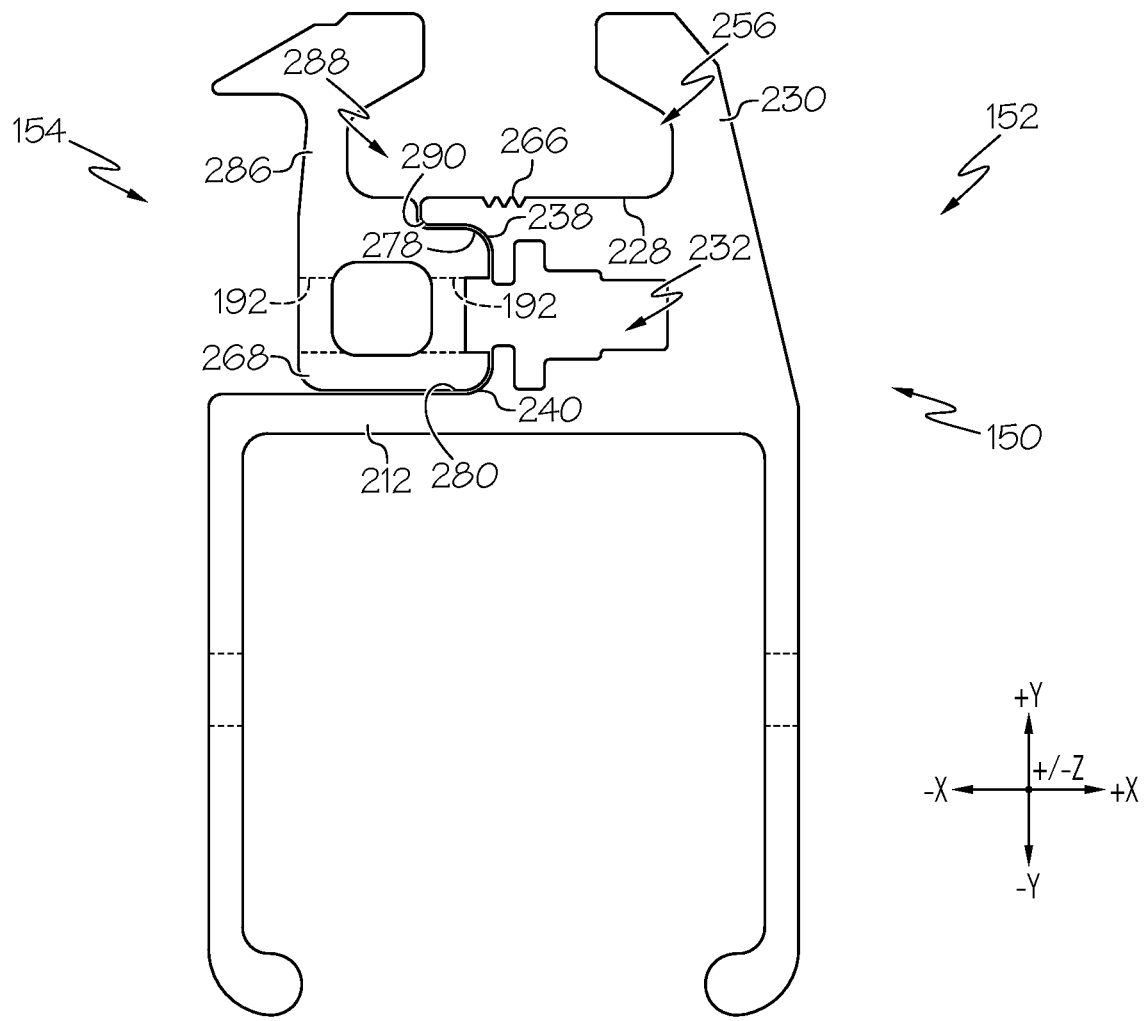
FIG. 7 schematically depicts an end view of the first rail member of FIG. 5 and the second rail member of FIG. 6 in a mating position, according to one or more embodiments shown and described herein.

Referring now to FIG. 7, the first rail member 152 and the second rail member 154 are shown in a mating position with one another. In the mating position, the second rail member 154 is seated on the first rail member 152. More particularly, the second base wall 268 of the second rail member 154 is seated on the first base wall 212 of the first rail member 152. In the mating position, the holes 192 formed in the second rail member 154 are coaxial with the nut recess 232 formed in the first rail member 152 such that shaft 188 of the locking mechanism 186 (FIG. 3) may be inserted through the second rail member 154 and received within the first rail member 152. It should be appreciated that, in embodiments, there may be a gap formed between the second base wall 268 of the second rail member 154 and the first base wall 212 of the first rail member 152, which are parallel to one another, when in the mating position to ensure that the holes 192 formed in the second rail member 154 align with the nut recess 232 formed in the first rail member 152. In other embodiments, the second base wall 268 of the second rail member 154 may be in direct contact with the first base wall 212 of the first rail member 152 when in the mating position.

Additionally, when the first rail member 152 and the second rail member 154 are in the mating position, the lower convex surface 280 of the second rail member 154 is received within the lower concave surface 240 formed in the first rail member 152. Similarly, the upper convex surface 278 of the second rail member 154 is received within the upper concave surface 238 first rail member 152. Additionally, the first bottom retaining wall 228 of the first rail member 152 is received within the step 290 formed in the second rail member 154. Thus, when in the mating position, the first blade cavity 256 and the second blade cavity 288 cooperate to retain the blade 146 (FIG. 4) between the first rail member 152 and the second rail member 154. Specifically, the first blade cavity 256 and the second blade cavity 288 receive the first shoulder 208 and the second shoulder 210, respectively, of the blade 146 and define a tapered geometry corresponding to the neck 206 of the blade 146 to prevent the blade 146 from being removed in the vertical direction when the first rail member 152 and the second rail member 154 are secured to one another. Rather, if the second rail member 154 is not removed entirely from the first rail member 152 by removing the locking mechanism 186 (FIG. 3), the blade 146 may be slid along the first rail member 152 and the second rail member 154 in the longitudinal direction. Accordingly, a distance between the first rail member 152 and the second rail member 154 at a first location configured to receive the neck 206 of the blade 146 is less than a distance between the first rail member 152 and the second rail member 154 at a second location configured to receive the first shoulder 208 and the second shoulder 210 of the blade 146. The first location is closer to the first bottom retaining wall 228 than the second location.

Further, when the first rail member 152 and the second rail member 154 are in the mating position, the plurality of ridges 266 formed on the first bottom retaining wall 228 are provided in a medial position equidistantly between the first side retaining wall 230 and the second side retaining wall 286. Thus, the plurality of ridges 266 are provided at a medial location on the bottom end 184 of the blade 146 between the first shoulder 208 and the second shoulder 210.

From the above, it is to be appreciated that defined herein are two-piece conveyor belt cleaning assemblies including a first rail member having a first inner taper portion, a second rail member including a second inner taper portion and a locking mechanism for removably securing the first rail member to the second rail member. The first inner taper portion of the first rail member defines a first blade cavity for receiving a first shoulder of a blade, and the second inner taper portion of the second rail member defines a second blade cavity for receiving a second shoulder of the blade. The second blade cavity is a mirror image of the first blade cavity.

While particular embodiments have been illustrated and described herein, it should be understood that various other changes and modifications may be made without departing from the scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A conveyor belt cleaning assembly comprising:
a first rail member including a first base wall, a first leg extending from a first end of the first base wall, a second leg extending from a second end of the first base wall opposite the first leg, a first bottom retaining wall, and a first side retaining wall defining a first inner taper portion extending inwardly toward the second leg, wherein the first base wall, the first leg, and the second leg define a longitudinal channel;
a second rail member including a second base wall, an inner wall, an outer wall opposite the inner wall, a second bottom retaining wall, and a second side retaining wall defining a second inner taper portion extending inwardly toward the inner wall, the second inner taper portion being a mirror image of the first inner taper portion; and
a locking mechanism extending at least partially through the first rail member and the second rail member to removably secure the first rail member to the second rail member.

2. The conveyor belt cleaning assembly of claim 1, wherein the first rail member further comprises:
a first tip formed at an end of the first leg opposite the first base wall and extending toward the second leg; and
a second tip formed at an end of the second leg opposite the first base wall and extending toward the first leg, the first tip and the second tip defining an open bottom end of the channel.

3. The conveyor belt cleaning assembly of claim 1, wherein the channel has a rectangular cross-sectional geometry.

4. The conveyor belt cleaning assembly of claim 1, wherein the first leg and the second leg have a hole formed therein for receiving a locking pin.

5. The conveyor belt cleaning assembly of claim 1, further comprising a handle pivotally attached to the first rail member.

6. The conveyor belt cleaning assembly of claim 5, wherein the handle is pivotally attached at an end of the first rail member.

7. The conveyor belt cleaning assembly of claim 1, wherein the locking mechanism comprises an internally threaded shaft and an internally threaded bolt.

8. The conveyor belt cleaning assembly of claim 7, wherein a nut recess is defined by the first base wall, the first bottom retaining wall, and a medial wall extending between the first base wall and the first bottom retaining wall, the second end of the shaft being received within the nut recess.

9. The conveyor belt assembly of claim 8, wherein the locking mechanism further comprises a fixing bar, the bolt fixed to the fixing bar.

10. A conveyor belt assembly comprising:
   a roller;
   a conveyor belt rotatable across an exterior surface of the roller;
   a conveyor belt cleaning assembly comprising:
      a first rail member including a first base wall, a first leg extending from a first end of the first base wall, a second leg extending from a second end of the first base wall opposite the first leg, a first bottom retaining wall, and a first side retaining wall defining a first inner taper portion extending inwardly toward the second leg, wherein the first base wall, the first leg, and the second leg define a longitudinal channel;
      a second rail member including a second base wall, an inner wall, an outer wall opposite the inner wall, a second bottom retaining wall, and a second side retaining wall defining a second inner taper portion extending inwardly toward the inner wall, the second inner taper portion being a mirror image of the first inner taper portion; and
      a locking mechanism extending at least partially through the first rail member and the second rail member to removably secure the first rail member to the second rail member; and
   a blade secured between the first rail member and the second rail member, the blade including a first shoulder, a second shoulder, and a neck having a width less than a distance between the first shoulder and the second shoulder, wherein a tip end of the blade is positioned to contact an exterior surface of the conveyor belt.

11. The conveyor belt cleaning assembly of claim 10, wherein the first rail member further comprises:
   a first tip formed at an end of the first leg opposite the first base wall and extending toward the second leg; and
   a second tip formed at an end of the second leg opposite the first base wall and extending toward the first leg, the first tip and the second tip defining an open bottom end of the channel.

12. The conveyor belt cleaning assembly of claim 10, wherein the first leg and the second leg have a hole formed therein for receiving a locking pin.

13. The conveyor belt cleaning assembly of claim 10, further comprising a handle pivotally attached at an end of first rail member.

14. The conveyor belt cleaning assembly of claim 10, wherein the locking mechanism comprises an internally threaded shaft and an internally threaded bolt.

15. The conveyor belt cleaning assembly of claim 14, wherein a nut recess is defined by the first base wall, the first bottom retaining wall, and a medial wall extending between the first base wall and the first bottom retaining wall, the second end of the shaft being received within the nut recess.

16. The conveyor belt assembly of claim 15, wherein the locking mechanism further comprises a fixing bar, the bolt fixed to the fixing bar.

17. A method comprising:
   providing a first rail member having a first blade cavity;
   positioning a first shoulder of a blade within the first blade cavity;
   positioning a second rail member to mate with the first rail member such that a second shoulder of the blade is received within a second blade cavity; and
   inserting a locking mechanism at least partially through the first rail member and the second rail member to removably secure the second rail member to the first rail member to prevent removal of the blade from the first rail member and the second rail member.

18. The method of claim 17, wherein the first blade cavity is a mirror image of (Original) the second blade cavity.

19. The method of claim 17, wherein the first rail member comprises a first base wall, a first leg extending from an end of the base wall, and a second leg extending from an end of the base wall opposite the first leg, and the base wall, the first leg, and the second leg define a cavity for receiving a guide track.

* * * * *